United States Patent Office 3,267,179
Patented August 16, 1966

3,267,179
ACRYLIC POLYMERS CONTAINING 10-PINENYL-METHANOL AS PROCESSING AIDS FOR THERMOPLASTIC FORMULATIONS
Donald H. Russell, Pennsauken, and Alfred E. Borchert, Cherry Hill, N.J., assignors to The Atlantic Refining Company, Philadelphia, Pa., a corporation of Pennsylvania
No Drawing. Filed Dec. 31, 1964, Ser. No. 422,546
4 Claims. (Cl. 260—899)

This invention relates to thermoplastic resin compositions containing a pinene substituted polymer. More particularly, this invention relates to polyvinylchloride compositions containing an acrylic polymer in which the acrylate groups have been transesterified by 10-pinenylmethanol.

In the thermal processing of rigid or non-plasticized thermoplastic resins, it is advantageous to utilize a lubricant or a processing aid to decrease the viscosity of the molten polymer and thus reduce the energy requirements necessary to maintain the desired flow characteristics. However, heretofore the lubricant would continue to function at ambient temperatures and would adversely affect the impact strength of the final polymer composition. This necessitated the incorporation of certain costly compounds which would improve this impact strength.

It has been discovered that an acrylic polymer in which the acrylate groups have been esterified by 10-pinenylmethanol has the unique ability to act as a lubricant at processing temperatures and to function as an impact improver when the composition is near ambient conditions.

Therefore, it is an object of this invention to provide a novel additive for thermoplastic formulations which effectively reduces energy input requirements during processing and improves impact strength in the ambient polymer compositions.

It is a further object of this invention to provide polyvinylchloride compositions having high impact strength resulting from incorporation of an acrylic polymer which has been transesterified with 10-pinenylmethanol.

The pinene substituted polymer is prepared by polymerizing an acrylic monomer and then transesterifying the acrylate groups with 10-pinenylmethanol. The acrylic polymer may be represented by the following structural formula:

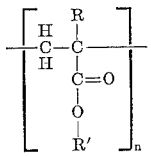

wherein R is hydrogen or the methyl group, R' is an alkyl group containing 1 to 8 carbon atoms, and $n$ is an integer representing the number of structural units occurring in the average polymer chain. To function as an impact improver, the polymer must be solid at ambient temperatures. It has been found that the inclusion of minor amounts of cyclohexyl methacrylate in the main polymer chain enhances the esterification characteristics. Therefore, a preferred acrylate polymer is one comprising from 90 to 70 mole percent methyl acrylate and from 10 to 30 mole percent cyclohexyl methacrylate.

The acrylic polymer may be prepared by any of the conventional polymerization methods utilized for this class of polymers. A suitable process is one utilizing an azobisisobutyronitrile initiator in a heated xylene diluent.

The transesterification may be conducted at elevated temperatures in the presence of catalyst by adding 10-pinenylmethanol to the diluent containing the acrylic polymer. The esterified polymer may be isolated from this solution by precipitation with methanol.

Transesterification must be conducted under conditions which do not destroy the bicyclic pinene system. A suitable method for transesterification has been set forth in U.S. Patent No. 3,058,965.

Acceptable polymers are produced by transesterification on as little as 20 percent or as much as 100 percent of the available sites. Since the lubrication and impact characteristics are dependent upon the presence of the pinene group, polymers having lower degrees of esterification must necessarily be utilized in higher loadings in the thermoplastic composition to attain the same degree of improvement.

The above reactions may be represented as follows:

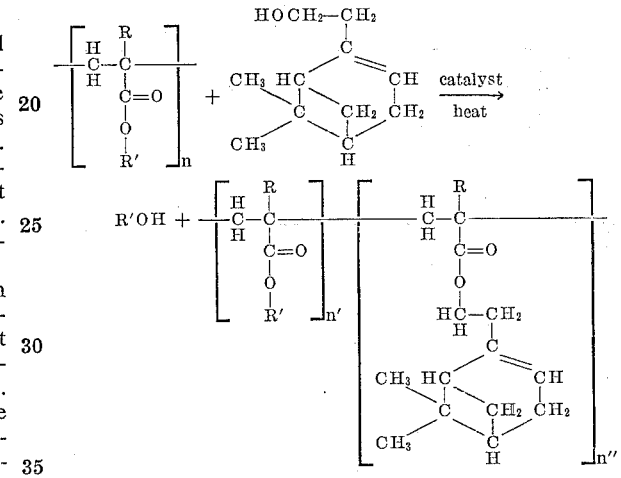

wherein R is selected from the group consisting of a methyl group and hydrogen, R' is an alkyl group containing 1 to 8 carbon atoms, and $n$, $n'$, and $n''$ are integers representing the number of structural units occurring in the average polymer chain. The sum of $n'$ and $n''$ is equal to $n$.

These pinene substituted polymers are compatible with polyvinylchloride in all proportions. For example, homogeneous blends having equal amounts by weight of polyvinylchloride and poly(10-pinenylmethyl acrylate) have been formulated. The preferred loadings range in amounts up to 15 percent by weight pinene substituted polymer in the total formulation.

No advantage is found with polyvinylchloride compositions having pinene substituted polymer loadings in excess of 15 percent by weight. At higher loadings the polymer has only a plasticizing effect on the polyvinylchloride which can be more economically attained by utilizing smaller amounts of a more effective plasticizer.

The polymer may also be used as a lubricant in plasticized polyvinylchloride compositions, however, the presence of the plasticizer impairs the impact improving characteristics of the pinene polymer.

The thermoplastic composition may include other additives which are normally added to the polyvinylchloride resin for the purpose of enhancing or protecting its basic properties. Included in this class are additives such as heat stabilizers, anti-oxidants, pigments, plasticizers, blocking agents, lubricants, fillers, other impact improvers, ultraviolet light stabilizers and structural stabilizers.

*Example I.—Preparation of 10-pinenyl methacrylate copolymer*

A copolymer was prepared by polymerizing 645 grams (6.4 moles) of methyl acrylate with 134 grams (0.8 mole) of cyclohexyl methacrylate in the presence of 7.5 grams of azobisisobutyronitrile in 1700 ml. of xylene diluent at 80° C. Without isolating the resultant polymer, transesterification was initiated at the methyl and cyclohexyl groups by adding 332 grams (2 moles) of 10-pinenyl methanol and 25 grams tetraisopropyl titanate and raising the xylene temperature to 140° C. The polymer was isolated by precipitation from methanol. This polymer was a white solid having an intrinsic viscosity of .14 dl./gram and containing 46.6 weight percent 10-pinenylmethyl acrylate.

*Example II*

The polymer from Example I was compared with an acrylate processing aid and found to impart reductions in mixing torque of up to 50 percent and improvements in impact strength of up to 250 percent. The following formulation was blended and milled in accordance with recognized processing techniques.

| Formulation No. | 1 | 2 | 3 | 4 |
|---|---|---|---|---|
| | Parts by weight | | | |
| Polyvinylchloride | 95 | 95 | 90 | 90 |
| Polymer from Example I | | 7.5 | | 7.5 |
| Ethyl Acrylate/Methyl Methacrylate Processing Aid (50/50 ETA/MMA) | 7.5 | | 7.5 | |
| Acryloid K 228 ᵃ | | | 12.5 | 12.5 |
| Titanium Dioxide | 4.0 | 4.0 | 4.0 | 4.0 |
| Organic Tin Stabilizer | 2.0 | 2.0 | 3.1 | 3.1 |
| Stearic Acid | 0.5 | 0.5 | | |
| Calcium Stearate | | | 2.0 | 2.0 |
| Percent Reduction in Mixing Torque ᵇ | | 40 | | 35 |
| Tensile Impace (ft.-lbs./in.²) (ASTM D 1822) | 15 | 51 | 24 | 68 |
| Tensile Yield (p.s.i.) (ASTM D 638) | 8,000 | 7,000 | 7,000 | 7,050 |
| Modulus (p.s.i.) (ASTM D 638) | 400,000 | 360,000 | 360,000 | 356,000 |
| Ultimate Elongation (percent) (ASTM D 638) | 4 | 17.6 | 8 | 24 |
| Heat Distortion Temperature, °F. @ 264 p.s.i. (ASTM D 648) | 160 | 158 | 162 | 159 |

ᵃ Trademark of Rohm & Haas—a rubber acrylate graft copolymer.
ᵇ Measured in Banbury head of Brabender Plastograph @ 174° F.

We claim:
1. A thermoplastic composition consisting essentially of a major amount of a polyvinylchloride resin and a minor amount of a normally solid acrylic polymer wherein from 20 to 100 percent of the acrylate groups have been transesterified with 10-pinenylmethanol said acrylic polymer having a structural formula

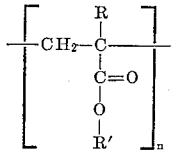

wherein R is selected from the group consisting of hydrogen and the methyl group, R' is an alkyl group containing 1 to 8 carbon atoms and $n$ is an integer representing the number of structural units occurring in the average polymer chain.

2. A composition according to claim 1 wherein the normally solid acrylic polymer is present in amounts ranging up to 15 parts by weight based on 100 parts by weight of the total composition.

3. A thermoplastic composition consisting essentially of a major amount of a polyvinylchloride resin and a minor amount of a normally solid acrylic polymer consisting essentially of from 70 to 90 mole percent methyl acrylate and from 30 to 10 mole percent cyclohexyl methacrylate and wherein 20 to 100 percent of the acrylate groups have been transesterized by 10-pinenylmethanol.

4. A composition according to claim 3 wherein the normally solid acrylic polymer is present in amounts ranging up to 15 parts by weight based on 100 parts by weight of the total composition.

References Cited by the Examiner

UNITED STATES PATENTS 3,058,965   10/1962   Gaylord _____ 260—86.1

MURRAY TILLMAN, *Primary Examiner.*

J. L. WHITE, *Assistant Examiner.*

UNITED STATES PATENT OFFICE
CERTIFICATE OF CORRECTION

Patent No. 3,267,179            August 16, 1966

Donald H. Russell et al.

It is hereby certified that error appears in the above numbered patent requiring correction and that the said Letters Patent should read as corrected below.

Column 4, line 29, for "transesterized" read -- transesterified --.

Signed and sealed this 1st day of August 1967.

(SEAL)
Attest:

EDWARD M. FLETCHER, JR.
Attesting Officer

EDWARD J. BRENNER
Commissioner of Patents